No. 666,717. Patented Jan. 29, 1901.
W. V. B. VAN DYCK.
APPARATUS FOR ROLLING PRISMATIC WINDOW GLASS.
(Application filed June 5, 1900.)

(No Model.)

Witnesses:
Raphaël Netty
M. Lawson Dyer

William V.B. Van Dyck, Inventor
by Kerr Page & Cooper Att'ys

UNITED STATES PATENT OFFICE.

WILLIAM V. B. VAN DYCK, OF NEW BRUNSWICK, NEW JERSEY, ASSIGNOR TO GEORGE M. WAGNER, OF PHILADELPHIA, PENNSYLVANIA.

APPARATUS FOR ROLLING PRISMATIC WINDOW-GLASS.

SPECIFICATION forming part of Letters Patent No. 666,717, dated January 29, 1901.

Application filed June 5, 1900. Serial No. 19,096. (No model.)

*To all whom it may concern:*

Be it known that I, WILLIAM V. B. VAN DYCK, of New Brunswick, county of Middlesex, and State of New Jersey, have invented certain new and useful Improvements in Apparatus for Rolling Prismatic Window-Glass, of which the following is a full, clear, and exact description, reference being had to the drawings which accompany and form part of the same.

My invention is designed to obviate the difficulties which have been met with heretofore in manufacturing prismatic window-glass in large sheets by the rolling process. These difficulties are always present and more or less objectionable in practice and detrimental to the efficiency of the product, but with reference to certain forms of prisms have been found to be so serious as to prohibit their manufacture by present processes. My invention is particularly directed to an improvement in the form of the table or bed-plate upon which the prismatic face of the glass sheet is formed. It has been found heretofore in producing this form of glass by rolling that the glass adhered to the upper angles of the corrugated surface of the bed-plate of the rolling apparatus, thereby producing blemishes in the glass or cracks while it was being removed. This adherence is due probably to the unequal expansion of the glass and the material of the bed-plate, although other causes may contribute to the effect. However that may be, the blemishing or destruction is so certain to occur as to prohibit the rolling of certain forms of prismatic glass by the apparatus now in use. I have found, for example, that it is almost inevitable when the desired height of the angular section is as much as or greater than 1.45 times the width of its base. Where the ratio is less than this, the defects are less liable to occur, but by no means unknown. By the use of my device prismatic glass of any of the ordinary forms now employed for windows, skylights, or canopies may be rolled safely and perfectly.

In carrying out my invention I slightly flatten or curve the tops of the angular sections or ribs of the bed-plate, thus causing a slight separation between the several prisms of the glass rolled thereon, taking care, however, not to do this to such an extent as to interfere with the proper refraction of the rays of light in the finished product.

Figure 1:
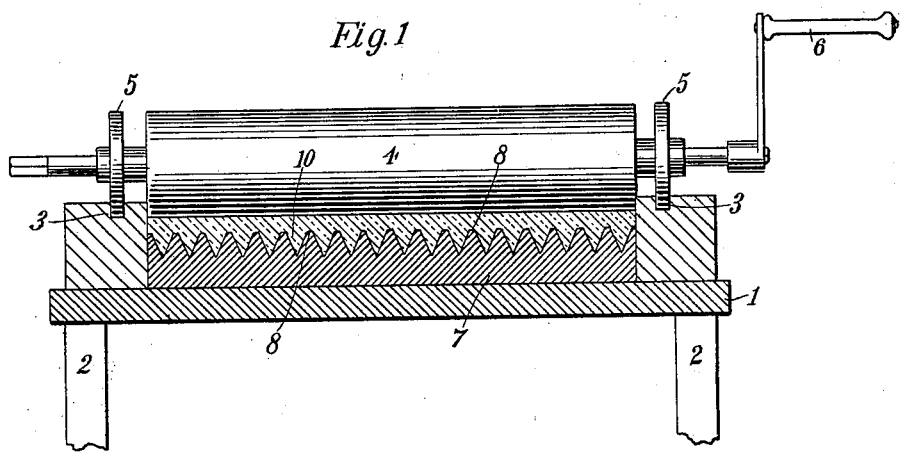
Figure 2:
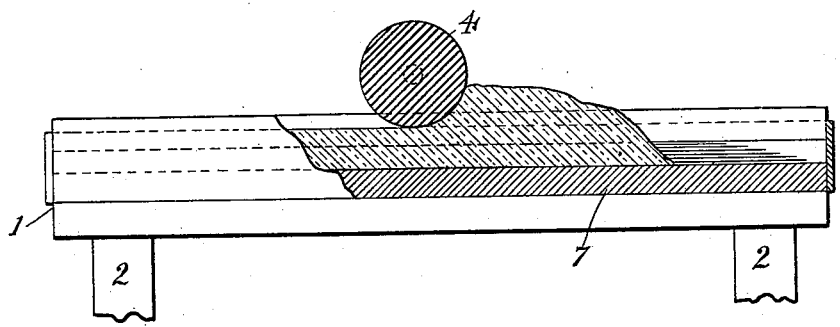
Figure 3:
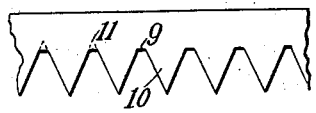

In the accompanying drawings, Figure 1 is a cross-section through a glass-rolling table having my invention applied, the roller, however, being shown conventionally. Fig. 2 is a side elevation, partly in section, of the same. Fig. 3 is a detail, enlarged, of a glass plate produced with my apparatus.

1 represents a glass-rolling table mounted on suitable supports 2 2. The roller 4 may be provided with flanges 5 5 at each end, which travel in grooves 3 3, formed at each side of the table. The roller is caused to move from end to end of the table by turning a crank 6. This construction is typical only, as it is unessential to my invention how the relative movement of the roller and table is produced. As is well understood, the roller may be mounted in stationary journals and the table may travel to and fro under it.

On the table is a bed-plate 7, which, as shown more clearly in Fig. 1, has a series of ribs or corrugations, preferably running longitudinally of it. Each rib of the bed-plate has a slightly flattened or curved top formed by joining the inclined sides of the rib by a narrow flat or curved surface 8, instead of extending the sides until they meet each other. This flattening or curvature 8 may be in the manufacture of the prismatic glass ordinarily used for window-sashes and canopies from one one-hundredth to one-thirtieth of an inch in width. I have found that between these limits no ill effect is produced in the glass and the former objections to its manufacture are obviated.

The operation of the mechanism which I have described is similar to that of any other glass-rolling table. The melted glass is poured upon the bed-plate, and the roller is pushed over it by the operation of the crank, thus forcing the plastic mass down upon the bed-plate, so that the side of the resulting sheet of glass which is in contact with the bed-plate is impressed by the corrugations of the bed-plate.

It will be seen that my invention may be applied to any form of glass-rolling mechanism suitable for making prismatic canopy, skylight, or window glass, and that it is not limited to any particular bed-plate or other forming mechanism, but is of wide applicability in such devices. The bed-plate 9 and the roller 4 may be made of metal or other suitable material.

The flat or curved tops of the ridges form, of course, corresponding flat or curved bottoms in the troughs between the ribs on the glass, so as to separate the successive prismatic ridges from each other. This is illustrated in Fig. 3, where 9 indicates the separation between the prisms 10, the dotted lines at 11 showing the extension of the sides of the ribs to a meeting-point, as in the former practice. If care is taken to keep this flattening within safe limits, no objectionable black or non-radiating streaks will result when the glass is in use. The extremes which I have mentioned are safe for all the ordinary forms of glass; but if sufficient care be employed a narrower top than one one-hundredth of an inch may in some cases be used in the bed-plate without serious injury to the glass or a wider top than one-thirtieth of an inch without the production of streaks in the radiating-surface.

What I claim as my invention is—

1. In a device for rolling prismatic glass, the combination of a roller and a bed-plate provided with ribs substantially angular in cross-section, said ribs having their inclined sides joined by a relatively narrow intermediate surface, substantially as and for the purposes described.

2. A bed-plate for prismatic-glass-rolling mechanism, consisting of a ribbed plate, the ribs of which are substantially angular in cross-section and have their inclined sides joined at the top by an intermediate surface, substantially as and for the purposes described.

3. A bed-plate for prismatic-glass-rolling mechanism, consisting of a plate having a series of parallel ribs, each substantially triangular in cross-section and slightly truncated, substantially as and for the purposes described.

4. In a device for rolling prismatic glass sheets, the combination with means for flattening the plastic glass into sheets or plates, of means for forming upon the surface of the glass prisms angular in cross-section, and means for separating slightly the prismatic ridges from each other, substantially as described.

WILLIAM V. B. VAN DYCK.

Witnesses:
DRURY W. COOPER,
M. LAWSON DYER.